UNITED STATES PATENT OFFICE 2,159,605

MONOARYLIDES OF AROMATIC DICARBOXYLIC ACID HALIDES

Willy Schumacher and Paul Heimke, Frankfort-on-the-Main, Germany, assignors to General Aniline Works, Inc., New York, N. Y., a corporation of Delaware No Drawing. Application December 22, 1937, Serial No. 181,164. In Germany December 23, 1936

6 Claims. (Cl. 260—558)

The present invention relates to monoarylides of aromatic dicarboxylic acid halides; more particularly it relates to compounds of the following general formula:

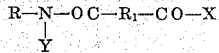

wherein R stands for a radical of the benzene or naphthalene series or a hydrogenation product thereof, $R_1$ for a radical of the benzene or naphthalene series, X means halogen and Y stands for hydrogen or alkyl.

We have found that monoarylides of aromatic dicarboxylic acid halides, hitherto not described in the literature, are obtainable with a good yield by causing one molecular proportion of an amino-compound of the benzene or naphthalene series or a hydrogenation product thereof in the form of a salt to act on one molecular proportion of an aromatic dicarboxylic acid halide of the benzene or naphthalene series in the presence of a suitable organic solvent.

In some cases the reaction may also be conducted with the aid of the free amine, but the monoarylides obtained contain in these cases as impurities more or less diarylides. The yield of the desired products is, therefore, essentially diminished.

As solvents there may be mentioned ketones, such as acetone, methyl-ethyl-ketone, diethyl-ketone, as well as hydrocarbons, such as benzene and xylene, alone or in admixture with the ketones mentioned, furthermore dioxane.

In order to perform the condensation the amine-salt is advantageously introduced into the warm solution of the acid chloride and the mixture is heated until the dicarboxylic acid diarylide begins to separate. The product may be worked up in a very simple manner, for instance by filtering small quantities of diarylide formed during the reaction and subsequently cooling the solution.

The compounds obtained by the present invention may be used as intermediate products for the manufacture of dyestuffs, pharmaceutical products and auxiliary agents in the textile industry.

The following examples serve to illustrate the invention, but they are not intended to limit it thereto; the parts are by weight: the relationship between parts by weight and parts by volume is that which exists between a kilo and a liter.

1. 65 parts of aniline hydrochloride are introduced into a solution of 112 parts of terephthaloyl chloride in 600 parts by volume of acetone at 50° C. to 55° C. The aniline salt dissolves gradually. When the introduction is finished, the mixture is heated to boiling until the terephthaloyldianilide formed in small quantities begins to separate. Thereupon the mixture is filtered at once and by intense cooling the terephthaloyl-1-anilide-4-chloride of the formula:

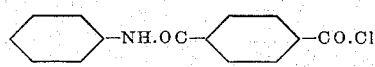

is obtained in the form of colorless crystals. The product is filtered with suction, washed with cold acetone and dried under reduced pressure at room temperature. It then melts at 274° C. to 275° C. By concentrating the mother liquor and subsequently cooling further quantities of the compound are obtained. The yield amounts to 90 to 95 per cent. of the theoretical (calculated upon aniline hydrochloride). The analysis shows: Cl found 13.72%, Cl calculated 13.66%.

By using instead of acetone as solvent other ketones such as methylethyl ketone or diethyl ketone, the terephthaloyl-anilide-chloride is likewise obtained in a smooth reaction.

The product obtained in this manner behaves chemically as a normal acid chloride. For instance, it reacts energetically with aniline with formation of terephthaloyl-dianilide melting at 336° C. By heating with methyl alcohol there is obtained from the acid chloride in a likewise smooth reaction the terephthaloyl-1-anilide-4-methyl ester melting at 188° C. to 189° C. By boiling with water the acid chloride is transformed into the terephthaloyl-1-anilide-4-carboxylic acid melting at 313° C. to 314° C.

By suitable substitution of the parent materials various derivatives of the terephthaloyl-1-anilide-4-chloride may be obtained. Instead of the terephthaloyl-chloride there may also be used the corresponding terephthaloyl-bromide.

2. By dissolving 112 parts of terephthaloyl chloride in 600 parts by volume of dioxane and causing the solution to react with 65 parts of aniline hydrochloride in the manner described in Example 1, the terephthaloyl-1-anilide-4-chloride is also obtained with a good yield.

The same compound is formed by using the equivalent amount of aniline sulfate instead of the hydrochloride.

3. 65 parts of aniline hydrochloride are introduced into a solution of 112 parts of terephthaloyl chloride in a mixture of 400 parts by volume of benzene and 116 parts by volume of acetone at 50° C. to 60° C. The mixture is then heated to 50° C. to 60° C. until the salt has wholly dissolved.

After working up the solution as described in Example 1, the terephthaloyl-1-anilide-4-chloride is obtained with a good yield.

With the same success there may be used instead of aniline hydrochloride the aniline oxalate.

4. 87 parts of 4-nitraniline hydrochloride are introduced at 50° C. into 660 parts of a solution of 17 per cent. strength of terephthaloyl chloride in acetone. The whole is then heated to boiling until the terephthaloyl-di-(4-nitranilide) begins to separate. The reaction product worked up as indicated in Example 1 is the terephthaloyl-1-(4'-nitranilide)-4-chloride which melts at 292° C. to 293° C. and is obtained with a yield of 90 per cent. of the theoretical.

The terephthaloyl-1-(3'-nitranilide)-4-chloride obtainable in an analogous manner melts at 322° C.

5. 80 parts of 4-methoxyaniline hydrochloride are added to a solution of 112 parts of terephthaloyl chloride in 600 parts by volume of acetone at 50° C. to 55° C. After boiling for a short time the terephthaloyl-1-(4'-methoxyanilide)-4-chloride melting at 289° C. to 291° C. is isolated in the usual manner with a good yield.

6. By dissolving 112 parts of terephthaloyl chloride in 400 parts by volume of acetone and condensing in a manner analogous to that of the preceding examples with 109 parts of 1-amino-2,5-diethoxybenzene hydrochloride the terephthaloyl-1-(2',5'-diethoxyanilide)-4-chloride melting at 109° C. to 110° C. is obtained in a smooth reaction. The analysis shows: Cl found 10.18%, Cl calculated 10.21%.

7. In the manner described in the preceding examples there is obtained from 112 parts of terephthaloyl-chloride, 600 parts by volume of acetone and 99 parts of 2,4-dichloraniline hydrochloride the terephthaloyl-1-(2',4'-dichloranilide)-4-chloride melting at 140° C. with a good yield.

8. By adding 90 parts of 2-naphthylamine hydrochloride to a solution of 112 parts of terephthaloyl chloride in 600 parts by volume of acetone at 50° C. to 55° C. and working up in the usual manner, the terephthaloyl-1-(2'-naphthylamide)-4-chloride melting at 264° C. to 267° C. is obtained in a smooth manner.

By using instead of 90 parts of 2-naphthylamine hydrochloride the equivalent amount of 4-chloro-1-naphthylamine hydrochloride the terephthaloyl-1-(4'-chloro-1'-naphthylamide)-4-chloride is obtained in an analogous manner.

9. By condensing 79 parts of N-ethylaniline hydrochloride with 112 parts of terephthaloyl chloride in 600 parts by volume of acetone at 50° C. to 60° C. the terephthaloyl-1-(N-ethylanilide)-4-chloride melting at 88° C. to 90° C. is obtained with a good yield. The analysis shows:

Cl found 11.95%, Cl calculated 12.33%
N found 4.73%, N calculated 4.87%

10. 68 parts of cyclohexylamine hydrochloride are introduced into a solution of 112 parts terephthaloyl chloride in 800 parts by volume of xylene at 120° C. to 130° C. The cyclohexylamine hydrochloride dissolves after a short time with elimination of hydrochloric acid gas. At about 120° C. small amounts of terephthaloyl-dicyclohexylamide are filtered with suction. The terephthaloyl-1-cyclohexylamide-4-chloride crystallizes from the strongly cooled xylene solution. After filtering with suction and drying under reduced pressure at about 40° C. to 45° C. it melts at 174° C.; on heating to a higher temperature it solidifies again at once and melts once more at 228° C. to 229° C. with evolution of gas. The analysis shows:

Cl found 13.06%, Cl calculated 13.35%
N found 5.07%, N calculated 5.27%

11. By adding 92 parts of 5,6,7,8-tetrahydro-2-naphthylamine hydrochloride to a solution of 112 parts of terephthaloyl chloride in 600 parts by volume of acetone at 50° C. to 55° C., boiling for a short time and working up in the usual manner there is obtained the terephthaloyl-1-(5',6',7',8'-tetrahydro-2'-naphthylamide)-4-chloride. It melts at 171° C., solidifies at once when heating to a higher temperature and melts then at 230° C. to 240° C.

12. 65 parts of aniline hydrochloride are introduced into a solution of 112 parts of isophthaloyl chloride in 600 parts by volume of acetone at 50° C. to 60° C., whereupon after heating for a short time the whole is worked up in the usual manner. The isophthaloyl-1-anilide-3-chloride obtained with a good yield melts at 238° C. to 239° C.

13. The isophthaloyl-1-(4'-nitranilide)-3-chloride melting at 303° C. to 305° C. is obtained in similar manner from 87 parts of 4-nitraniline hydrochloride, 112 parts of isophthaloylchloride and 600 parts by volume of acetone.

Instead of the isophthaloylchloride used in this example the corresponding isophthaloylbromide may be used. Also other substitution products of the isophthaloylchloride or the amine yield, according to this example, the corresponding substitution products of the arylide chloride.

14. By condensing 87 parts of 4-nitraniline hydrochloride with 130 parts of chloroterephthaloyl chloride in 600 parts by volume of acetone at 50° C. to 60° C., the chloroterephthaloyl-1-(4'-nitranilide)-4-chloride melting at 94° C. to 95° C. is obtained.

Instead of the chloro-derivative used in this example the corresponding bromo-derivative may be used whereby the bromoterephthaloyl-1-(4'-nitranilide)-4-chloride is obtained. Other substitution products of terephthaloylchloride, for instance, the nitroterephthaloyl-chloride, or other amines may be used also in this case. The corresponding substituted arylide-chlorides are obtained with a good yield.

15. 139 parts of 1,4-naphthalene dicarboxylic acid chloride are dissolved in 400 parts by volume of acetone and 87 parts of 4-nitraniline hydrochloride are then introduced into the solution at 50° C. to 55° C. After boiling for a short time, the whole is worked up in the usual manner. The naphthalene dicarboxylic acid-1-(4'-nitranilide)-4-chloride obtained in the form of a light green powder melts at 148° C. to 149° C.

16. By conducting the operation in the same manner as in the preceding examples there is obtained from 139 parts of 1,5-naphthalene dicarboxylic acid chloride, 800 parts by volume of acetone and 99 parts of 2,4-dichloraniline hydrochloride with a good yield the naphthalene dicarboxylic acid-1-(2',4'-dichloranilide)-5-chloride in the form of colorless small needles melting at 140° C. to 142° C.

We claim:

1. The monoarylides of aromatic dicarboxylic acid halides corresponding with the following general formula:

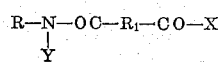

wherein the CO-groups do not stand in ortho-position to each other, R stands for a member of the group consisting of radicals of the benzene and naphthalene series, cyclohexyl and tetrahydronaphthyl, $R_1$ for a member of the group consisting of phenyl, halogen-phenyl, nitro-phenyl and naphthyl, X stands for a member of the group consisting of chlorine and bromine, and Y for a member of the group consisting of hydrogen and alkyl, being crystallized compounds which give the reactions usual for acid halides and react, for instance, with aromatic amines with formation of the corresponding diarylides.

2. The monoarylides of aromatic dicarboxylic acid halides corresponding with the following general formula:

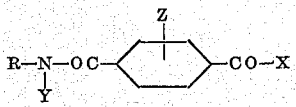

wherein R stands for a member of the group consisting of radicals of the benzene and naphthalene series, cyclohexyl and tetrahydronaphthyl, X stands for a member of the group consisting of chlorine and bromine, Y for a member of the group consisting of hydrogen and alkyl, and Z means a member of the group consisting of hydrogen, halogen and nitro, being crystallized compounds which give the reactions usual for acid halides and react, for instance, with aromatic amines with formation of the corresponding diarylides.

3. The monoarylides of aromatic dicarboxylic acid halides corresponding with the following general formula:

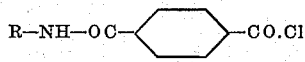

wherein R stands for a radical of the benzene series, being crystallized compounds which give the reactions usual for acid halides and react, for instance, with aromatic amines with formation of the corresponding diarylides.

4. The terephthaloyl-1-anilide-4-chloride of the formula:

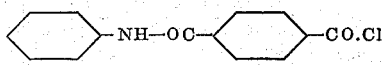

forming colorless crystals which melt at 274° C. to 275° C. and reacting with aniline with formation of terephthaloyl-dianilide melting at 336° C.

5. The terephthaloyl - 1 - (4' - nitranilide) - 4 - chloride of the formula:

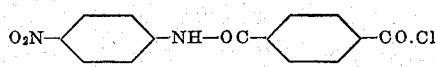

melting at 292° C. to 293° C.

6. The terephthaloyl-1-(2',5'-diethoxyanilide)-4-chloride of the formula:

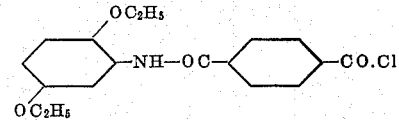

melting at 109° C. to 110° C.

WILLY SCHUMACHER.
PAUL HEIMKE.